United States Patent [19]

Lusk

[11] 4,079,186
[45] Mar. 14, 1978

[54] HIGH VOLTAGE OIL FILLED CABLE TERMINATION WITH OIL FILTER AND SKID WIRE SECURING MEANS

[75] Inventor: George E. Lusk, Woodstock, Ill.

[73] Assignee: Joslyn Mfg. and Supply Co., Chicago, Ill.

[21] Appl. No.: 647,148

[22] Filed: Jan. 7, 1976

[51] Int. Cl.² .................... H02G 15/22; B01D 39/16; B01D 25/18
[52] U.S. Cl. .................... 174/14 BH; 174/19; 174/73 R; 174/89; 210/488; 210/496; 210/500 R
[58] Field of Search .................. 174/14 R, 14 BH, 19, 174/20, 21 R, 73 R, 75 R, 75 D, 77 R, 89; 210/488, 496, 497 R, 500 R, 508, 510; 264/6, 12; 428/227, 296

[56] References Cited

U.S. PATENT DOCUMENTS

| | | | |
|---|---|---|---|
| 2,727,938 | 12/1955 | Nicholas | 174/19 |
| 2,961,710 | 11/1960 | Stark | 210/496 X |
| 2,988,469 | 6/1961 | Watson | 264/12 X |
| 3,005,556 | 10/1961 | Jensen | 210/488 |
| 3,073,735 | 1/1963 | Till et al. | 210/496 X |
| 3,243,499 | 3/1966 | Lusk | 174/89 X |
| 3,352,423 | 11/1967 | Osterman | 210/497 R X |
| 3,795,571 | 3/1974 | Prentice | 428/296 |
| 3,959,421 | 5/1976 | Weber et al. | 264/12 X |

FOREIGN PATENT DOCUMENTS 1,365,921    9/1974    United Kingdom .................. 174/19

OTHER PUBLICATIONS

Wente, Van. A., "Superfine Thermoplastic Fibers," Man-Made Textile Encyclopedia, Edited by J. J. Press and Published by Textile Book Publishers, Inc., ©1959, pp. 80-83.

*Primary Examiner*—Laramie E. Askin
*Attorney, Agent, or Firm*—Mason, Kolehmainen, Rathburn & Wyss

[57] ABSTRACT

An entrance fitting assembly is disposed at an interface between a high voltage power cable and a high pressure oil filled cable termination to physically and electrically terminate the power cable skid wires, to seal the power cable pipe system to the cable termination and to filter the dielectric liquid flowing between the power cable pipe system and the cable termination. The entrance fitting assembly includes a centering and support plate for receiving and securing the cable skid wires, an elastomeric semi-stop or oil seal and an oil filter. In accordance with a preferred embodiment of the present invention, the oil filter is formed by a monolithic, polymeric, porous, open cell solid in a configuration of a thin annular disc.

15 Claims, 9 Drawing Figures

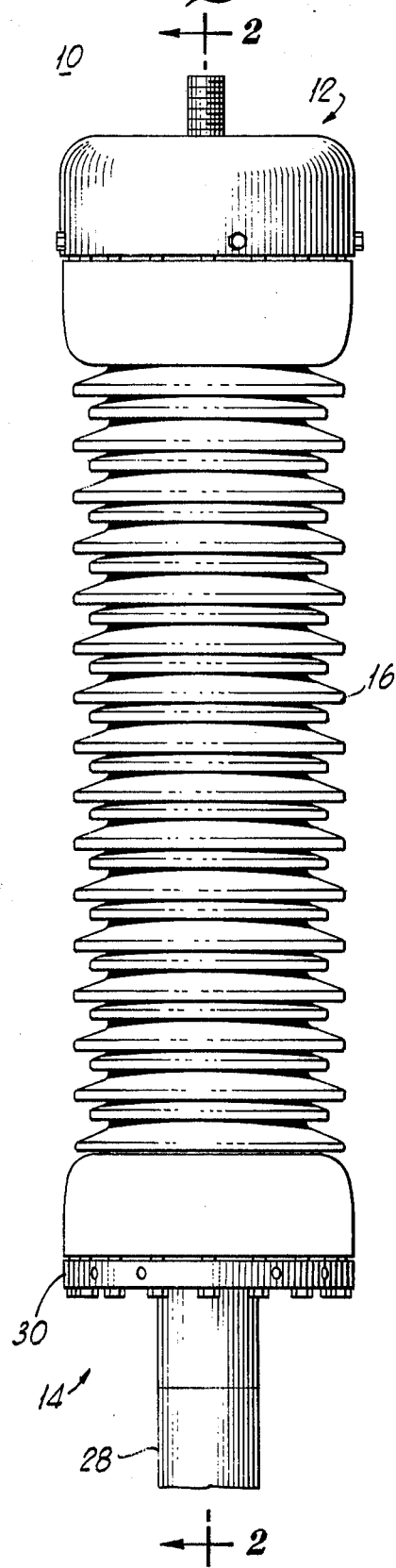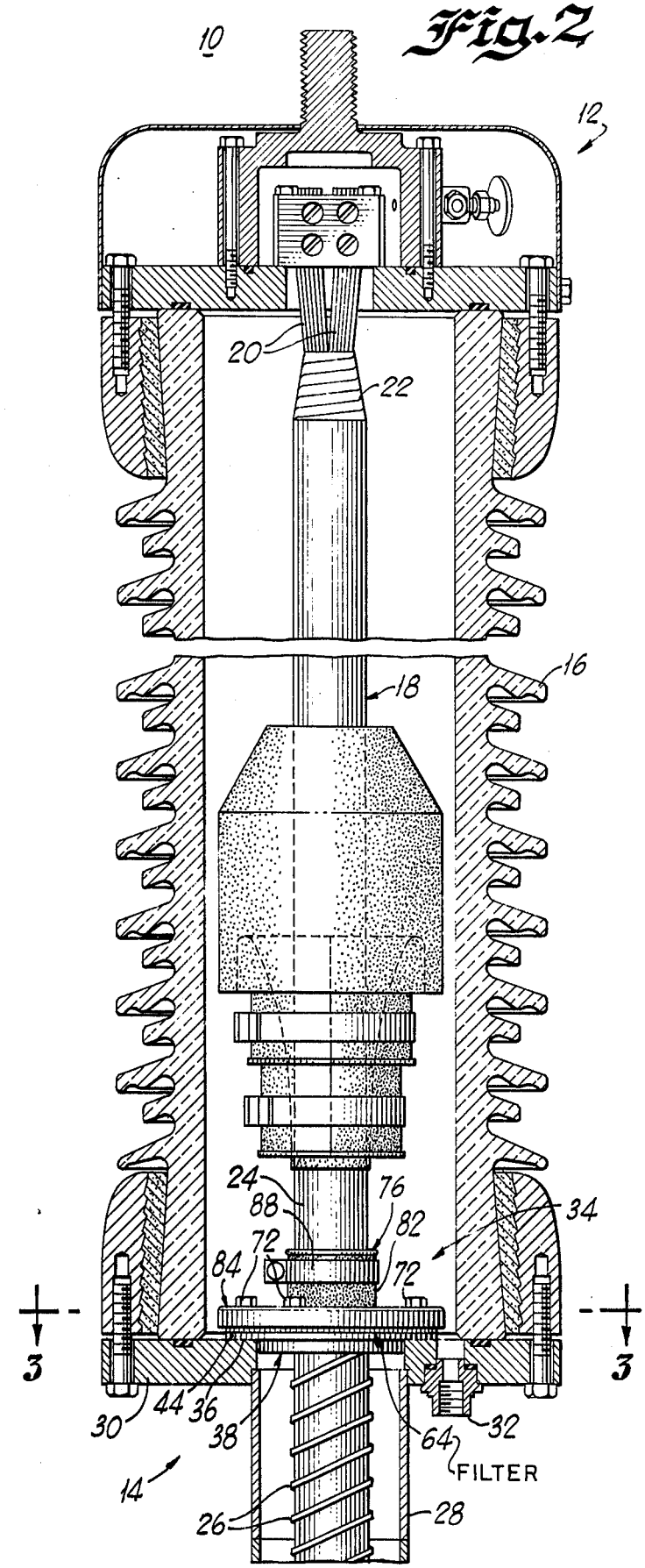

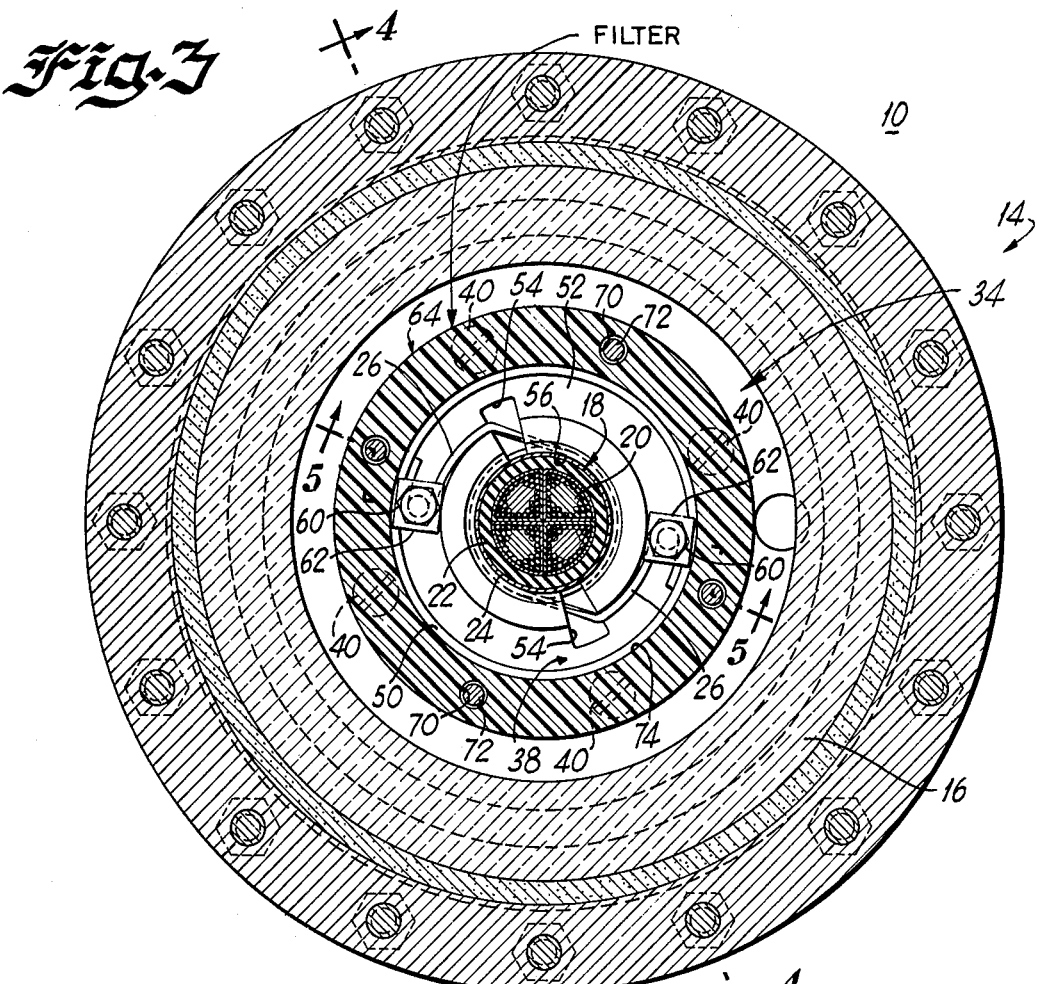
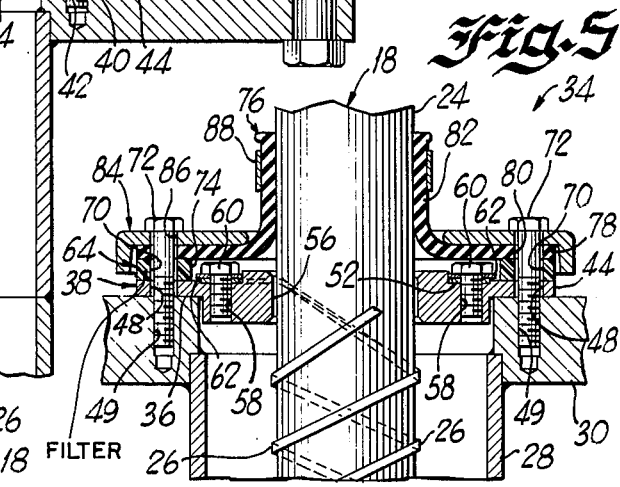

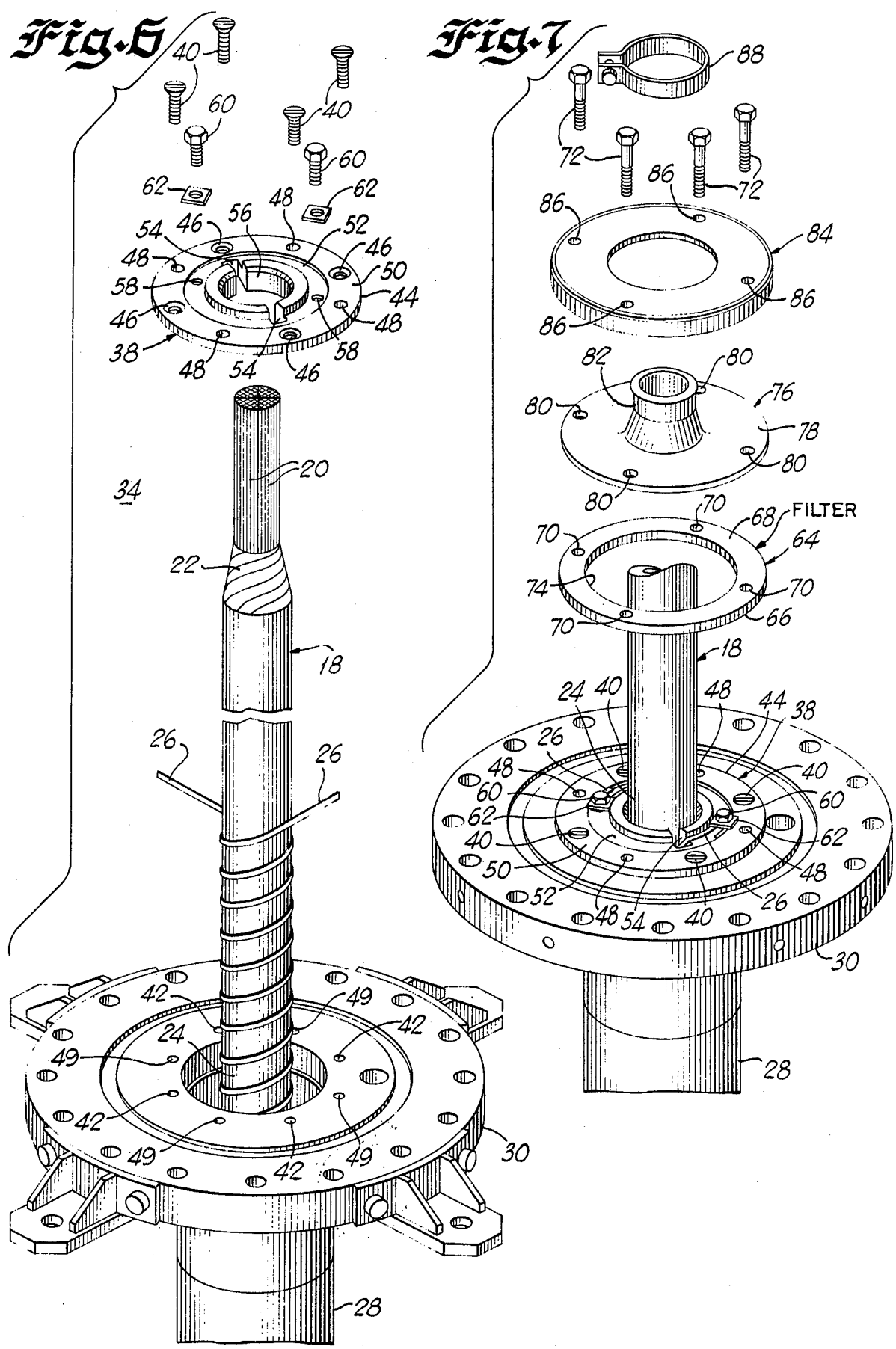

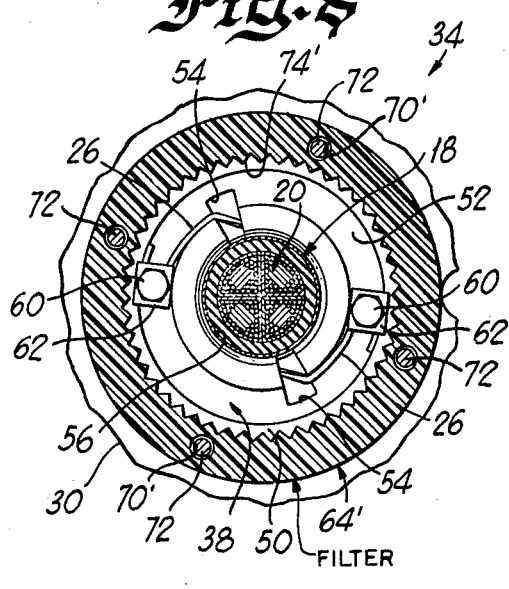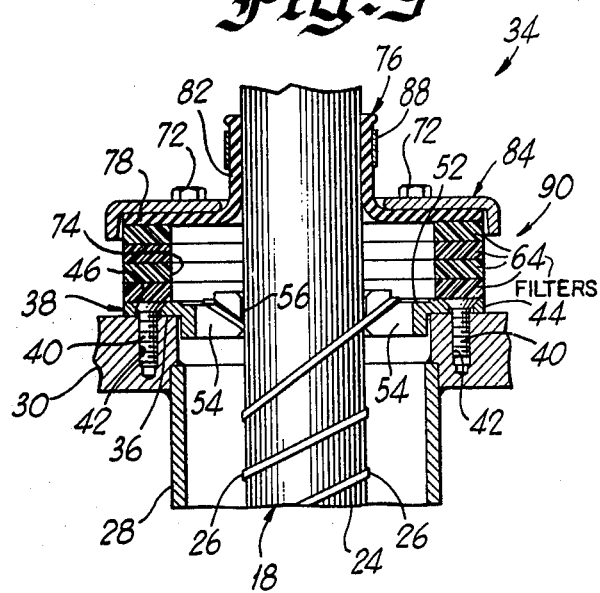

HIGH VOLTAGE OIL FILLED CABLE TERMINATION WITH OIL FILTER AND SKID WIRE SECURING MEANS

BACKGROUND OF THE INVENTION

A. Field of the Invention

The device of the present invention relates generally to a new and improved high voltage interface assembly and, more particularly, to a new and improved entrance fitting assembly disposed between a high voltage power cable and a high pressure oil filled cable termination.

B. Description of the Prior Art

United States Letters Pat. No. 2,727,938 illustrates one type of a high voltage electrical system in which a high voltage power cable 1 is maintained under very high oil pressure. Typically, in such a system, a relatively complex and often large and expensive fabricated body is required at the interface between the power cable and associated apparatus, such as the cable termination fragmentarily illustrated in the above-identified patent. The fabricated body includes the upper body 40 and the lower body formed by the circular plates 9 and 10 and the pipe 8. This fabricated body serves to terminate the conventional cable skid wires 4 and to ground the conductive cable sheath surrounding the power cable 1 by means of and through the metal wire wrapping 6. In addition, the fabricated body includes an oil seal formed, in this particular case, by the stack of annular gasket discs 19. Although not illustrated in the above-identified patent, in many cases a fabricated body houses one or more conventional oil filters formed by paper layers for filtering the oil flowing between the pipe 2 and the cable termination to prevent the passage of impurities, such as metal particles caused by the fretting of the metallic skid wires 4, into the interior of the cable termination. The requirement of the fabricated body as illustrated in the above-identified patent undesirably increases the complexity, cost and dimensions of high voltage cable terminations.

SUMMARY OF THE INVENTION

An object of the present invention is to provide a new and improved entrance fitting assembly at the interface between a high voltage power cable and an oil filled high voltage cable termination.

Another object of the present invention is to provide a new and improved liquid filter.

Another object of the present invention is to provide a new and improved oil filter for use in high voltage electrical systems.

Another object of the present invention is to provide a new and improved skid wire termination assembly.

Another object of the present invention is to provide a new and improved interface between a high voltage power cable and an associated high voltage apparatus.

Briefly, the present invention is directed to a new and improved entrance fitting assembly for disposition at the interface between a high voltage power cable and an oil filled high voltage cable termination. The entrance fitting assembly eliminates the need for the fabricated body formerly required at such an interface. The entrance fitting assembly includes an oil seal, an oil filter, and a skid wire support plate all occupying a minimal amount of space. The skid wire support plate physically and electrically terminates the metallic skid wires surrounding the power cable to enable the skid wires to physically support the weight of the power cable both above and below the interface between the power cable and the cable termination. In addition, the outer conductive cable sheath of the power cable may be electrically connected to a suitable source of reference potential, such as ground potential, through the skid wires terminated by the support plate. The oil seal may take a form of an elastomeric gland compressed against the terminated cable and an oil filter to guide the dielectric oil passing between the cable pipe system and the cable termination to flow through the oil filter.

The entrance fitting assembly includes a new and improved oil filter in an annular disc configuration formed by a monolithic, polymeric, porous, open cell solid. The word "solid" is used herein in its geometric sense to distinguish between a solid form, such as the annular disc oil filter 64 (FIG. 7), and a "plane" form, such as a layer of paper or cloth. The oil filter may be formed with a very small pore size, for example, ten microns, to effectively block the flow of impurities from the cable pipe system to the interior of the cable termination. A plurality of such annular disc oil filters may be used in a stacked configuration; and the interior of the annular disc oil filter may be cut, formed, scalloped or otherwise shaped to increase the available filtering surface.

BRIEF DESCRIPTION OF THE DRAWING

The above and other objects and advantages and novel features of the present invention will become apparent from the following detailed description of a preferred embodiment of the invention illustrated in the accompanying drawing wherein:

FIG. 1 is an elevational view of a high voltage cable termination that includes an entrance fitting assembly constructed in accordance with the principles of the present invention;

FIG. 2 is an enlarged, fragmentary, cross-sectional view of the cable termination of FIG. 1 taken along line 2—2 of FIG. 1;

FIG. 3 is an enlarged, cross-sectional view of a portion of the cable termination of FIG. 1 taken along line 3—3 of FIG. 2;

FIG. 4 is an enlarged, fragmentary, cross-sectional view of a portion of the cable termination of FIG. 1 taken along line 4—4 of FIG. 3;

FIG. 5 is an enlarged, fragmentary, cross-sectional view of a portion of the cable termination of FIG. 1 taken along line 5—5 of FIG. 3;

FIGS. 6 and 7 are enlarged, exploded, perspective views of a portion of the cable termination of FIG. 1 illustrating the manner in which an entrance fitting assembly is assembled within a cable termination in accordance with the principles of the present invention;

FIG. 8 is an enlarged, fragmentary, cross-sectional view of an alternate embodiment of an oil filter forming a portion of the entrance fitting assembly of the cable termination of FIG. 1; and FIG. 9 is an enlarged, fragmentary, cross-sectional view similar to the view of FIG. 5 illustrating an alternate embodiment of an oil filter forming a portion of the entrance fitting assembly of the cable termination of FIG. 1.

DESCRIPTION OF THE PREFERRED EMBODIMENT

A high pressure oil filled cable termination 10 (FIGS. 1 and 2) includes a top connector assembly 12, a base assembly 14 and a porcelain insulator 16 disposed therebetween. The cable termination 10 is used to terminate a high voltage power cable 18, for example, a 138KV power cable 18. The power cable 18 conventionally includes a segmented center conductor 20, cable insulation 22 surrounding the center conductor 20 and an outer conductive cable sheath 24. A plurality of conventional, conductive, metallic skid wires 26 are wound in a helical fashion about the cable sheath 24 to prevent damage to or destruction of the cable sheath 24 within a high pressure oil filled riser pipe stub or pipe 28 or the high pressure oil filled pipe system that connects with the cable termination 10 through the pipe 28.

The pipe 28 may be secured, for example by welding, to a metallic mounting plate 30 that is used to physically support the porcelain insulator 16. An oil fill fitting 32 may be provided to fill the cable termination 10 with dielectric oil or to drain dielectric oil from the cable termination 10 through the mounting plate 30.

In accordance with an important feature of the present invention, a new and improved entrance fitting assembly 34 (FIGS. 2 through 7) is provided at the interface between the pipe 28 and the cable termination 10. The entrance fitting assembly 34 provides, in a minimum amount of space, a simple and inexpensive device for forming an oil seal between the power cable 18 and the cable termination 10, for filtering the oil flowing between the pipe 28 and the interior of the cable termination 10 and for terminating the skid wires 26 to provide physical support for the power cable 18 and to electrically connect the cable sheath 24 to a source of reference potential, such as ground potential, through the normally grounded mounting plate 30 and pipe 28.

The assembly 34 includes a power cable centering and skid wire support plate 38 that is secured to the mounting plate 30 by the receipt of a plurality of threaded fasteners 40 in a plurality of threaded apertures 42 formed in the base plate 30. The plate 38 includes an outermost annular planar portion 44 having a plurality of apertures 46 and 48 therein. The apertures 46 are configured to permit the fasteners 40 to extend therethrough to a sufficient depth such that the uppermost portions of the fasteners 40 do not extend above an upper surface 50 of the planar portion 44.

The plate 38 includes a skid wire recess 52 disposed interiorly of the planar portion 44 for receiving the terminal ends of the skid wires 26. The skid wires 26 enter the recess 52 through a pair of elongated cut-outs or ports 54 that also permit the flow of oil between the pipe 28 and the cable termination 10 through the plate 38. The ports 54 extend from an innermost axially extending surface 56 into the recess 52 and also extend across the entire axial dimension or thickness of the plate 38. The corners formed by the skid wire recess 52 and the ports 54 are rounded, for example, with a one-fourth inch radius of curvature to prevent damage to the skid wires 26. A pair of threaded apertures 58 are provided in the recess 52 for receiving a pair of skid wire clamping bolts 60.

In assembling the cable termination 10, the power cable 18 is extended through and above the mounting plate 30. At this time, the cable insulation 22, cable sheath 24 and skid wires 26 are stripped to desired lengths. The plate 38 may then be slipped over the power cable 18 and secured by the fasteners 40 to the mounting plate 30. The inner diameter of the plate 38 is greater than the outer diameter of the power cable 18, providing a clearance therebetween.

After the plate 38 is secured to the mounting plate 30, the skid wires 26 extending through the ports 54 are looped about the bolts 60 that are then tightened to fixedly secure the skid wires 26 to the plate 38 and thus to the mounting plate 30. If desired, a pair of washers 62 may be used in conjunction with the bolts 60 to secure the ends of the skid wires 26 to the plate 38.

Subsequently, in accordance with an important feature of the present invention, a new and improved annular disc oil filter 64 that includes a lower planar surface 66 and an upper planar surface 68 is positioned over the power cable 18 and on the plate 38 such that the lower planar surface 66 of the filter 64 engages the upper planar surface 50 of the portion 44 of the plate 38. The filter 64 includes a plurality of axially extending apertures 70 that are aligned with the apertures 48 in the plate 38 for subsequent receipt of a plurality of threaded fasteners 72.

In accordance with an important feature of the present invention, the filter 64 is formed from a monolithic polymeric, porous, open cell solid having a very small pore size, for example ten microns, to effectively and efficiently block the passage of impurities, such as metal particles resulting from the fretting of the skid wires 26, during the flow of oil from the pipe 28 to the interior of the cable termination 10 through the filter 64. Due to the very small pore size of the filter 64, the impurities, specifically, the metal particles, are blocked by, but do not clog, the inner, axially extending filtering surface 74 of the filter 64.

The filter 64 may be formed in several different ways, such as by any one of a number of well known sintering processes. Alternately, the filter 64 could be formed by a filamentizing process disclosed in a copending application, entitled ELECTRICAL INSULATION SYSTEM, filed on Dec. 30, 1975, by George E. Lusk and accorded patent application Ser. No. 645,387 and assigned to the same assignee as the assignee of this application.

In accordance with a specific sintering process, preground polymeric material, specifically ultra high molecular weight ($2.8 \times 10^6$) polyethylene resin available from the Allied Chemical Corporation, is placed in a mold and subjected to a pressure of approximately 6,000 psi for approximately 30 seconds to 2 minutes depending upon the thickness of the final part. Preferably, the mold is configured to produce a porous, open cell, polymeric solid in a final desired configuration, such as the configuration of the filter 64. The polymeric solid formed is subsequently removed from the mold and is sintered in a circulating air oven at a temperature of from 305° to 335° F for a period of approximately two hours per inch of thickness. Subsequently, the solid is cooled and may be used in that form as the filter 64 or machined to a desired part configuration.

The finished particle diametric size of the component particles bonded together to form the porous, open cell, polymeric solid in accordance with the sintering process for use as the filter 64 are preferably in the range of 0.2 to 50 microns. The finished particle size and the apparent or relative density, that is, the actual density of the porous, open cell, polymeric solid as compared with the density of a completely solid or voidless block of material occupying the same volume as the solid, may be varied by the initial grinding of the thermoplastic resin and by suitably controlling the pressure, temperature and processing time of the specific sintering process used to form the dielectric solid.

Although, in a specific embodiment, polyethylene resin was used to form the filter 64, other polymeric materials, specifically, other thermoplastic materials and possibly mixtures of thermoplastic materials as well as mixtures of thermoplastic and non-thermoplastic materials may be used. For example, polyethylene, nylon, polycarbonate, polyester, vinylidene fluoride and polystyrene resins may be used to form the filter 64 in accordance with the above-mentioned sintering process.

In selecting a specific polymeric resin for use in forming the filter 64, consideration should be given to at least the chemical, mechanical and thermal characteristics of the thermoplastic resin, specifically, in its final form as the filter 64. For example, the filter 64 and the dielectric oil must be mutually chemically stable and nonsoluble. In addition, the filter 64 must be thermally stable throughout the entire operating temperature range of the cable termination 10. If the filter 64 is formed by the above-mentioned sintering process, consideration should be given to the grinding characteristics of the thermoplastic resin and the ability of the thermoplastic resin to provide the desired finished particle size.

The annular disc oil filter 64 formed in accordance with the above-mentioned sintering process is substantially non-compressible and functions very effectively and efficiently to provide a simple, inexpensive and extremely compact oil filter. In a specific embodiment, the annular disc oil filter 64 has an outer diameter of 7.50 inches, an inner diameter of 5.50 inches and a thickness of 0.375 inch; thus, the volume occupied by the material of the oil filter 64 is approximately 7.66 cubic inches.

Subsequently, in assembling the entrance fitting assembly 34, an elastomeric semi-stop gland or oil seal 76 having a radially extending planar portion 78, a plurality of axially extending apertures 80 extending through the planar portion 78 and an elongated, axially extending interior portion 82 is extended over the power cable 18 and brought into contact with the oil filter 64 such that the apertures 80 in the oil seal 76 are aligned with the apertures 70 in the filter 64. Since the inner diameter of the interior portion 82 is preferably slightly less than the outer diameter of the power cable 18, the interior portion 82 is stretched and the oil seal 76 conforms to the outer surface of the power cable 18.

After the oil seal 76 is positioned in engagement with the oil filter 64, a rigid annular cover plate 84 is positioned about the power cable 18 and brought into contact with the planar portion 78 of the oil seal 76 such that a plurality of axially extending apertures 86 are aligned with the apertures 80 in the oil seal 76. The fasteners 72 may then be inserted through the apertures 86, 80, 70 and 48 for threaded receipt by a plurality of apertures 49 in the mounting plate 30. The fasteners 72 are tightened to compress the assembly formed by the upper surface 50 of the plate 38, the oil filter 64, the oil seal 76 and the cover plate 84 to direct the flow of dielectric oil between the pipe 28 and the interior of the cable termination 10 only through the axial filtering surface 74 of the oil filter 64. An oil seal clamp 88 may then be brought into engagement with the axially extending interior portion 82 of the oil seal 76 to compress the interior portion 82 against the outer surface of the power cable 18, specifically against the cable sheath 24, and to thereby prevent the flow of dielectric oil therebetween.

Obviously, many modifications or variations of the present invention are possible in light of the above teachings. For example, in accordance with an important feature of the present invention, FIGS. 8 and 9 illustrate the manner in which an oil filtering surface of an oil filter constructed in accordance with the principles of the present invention may be increased. FIG. 8 illustrates an annular disc oil filter 64' identical to the oil filter 64 discussed above except that its inner axially extending filtering surface 74' is of a noncircular configuration in that it is cut, formed, scalloped or otherwise shaped to increase the available oil filtering surface. In an alternate embodiment, a stack 90 may be formed by a plurality of the annular disc oil filters 64 (or 64') in order to easily and effectively increase the available oil filtering surface.

Thus, it is to be understood that, within the scope of the appended claims, the invention may be practiced otherwise than as specifically described.

What is claimed and desired to be secured by Letters Patent of the United States is:

1. A high voltage, oil filled cable termination terminating a high voltage power cable both emerging from an oil filled pipe system and having a current carrying center conductor formed of a plurality of wire strands, cable insulation surrounding said current carrying center conductor, an outer conductive sheath surrounding said cable insulation and a plurality of skid wires disposed in a helical fashion about said outer conductive sheath comprising an elongated, rigid, dielectric insulator housing the terminated end of said power cable, an annular mounting plate disposed immediately adjacent the lower longitudinal end of said insulator and physically supporting said insulator thereabove, said mounting plate including means for enabling the passage of both said power cable and dielectric oil from said pipe system to the interior of said insulator, said passage enabling means comprising an aperture formed in said mounting plate, connector means disposed at the upper longitudinal end of said insulator for making an external electrical connection to said terminated end of said power cable and means for filtering the oil flowing between the interior of said insulator and the pipe system, said filtering means comprising an oil filter disposed above said mounting plate, within said insulator and below the termination of said outer conductive sheath within said insulator.

2. A cable termination as defined in claim 1 wherein said oil filter comprises a porous, open cell polymeric solid.

3. A cable termination as defined in claim 2 wherein said polymeric solid is formed by a plurality of component polymeric particles bonded together to form said solid, the average finished diametric size of said component particles being in the range of 0.2 micron to 50 microns.

4. A cable termination as defined in claim 1 wherein said oil filter comprises an annular disc solid.

5. A cable termination as defined in claim 1 further comprising means for physically supporting the weight of at least an elongated portion of said power cable, said physically supporting means comprising an annular support plate and means at least partially disposed above said mounting plate for physically securing said skid wires to said support plate, said support plate being disposed above and physically supported by said mounting plate and being disposed within said insulator.

6. A cable termination as defined in claim 5 wherein said securing means comprises a pair of threaded fasteners that engage a pair of threaded apertures formed in said annular support plate.

7. A cable termination as defined in claim 6 wherein said annular support plate further includes an annular recess formed therein receiving said skid wires, said threaded apertures being disposed in said recess.

8. A cable termination as defined in claim 6 further comprising means securely fastening said annular support plate to said annular mounting plate.

9. A cable termination as defined in claim 1 wherein the maximum dimension of said oil filter in a direction parallel to the longitudinal axis of said insulator does not exceed one inch.

10. A cable termination as defined in claim 9 wherein the maximum dimension of said oil filter in a direction parallel to the longitudinal axis of said insulator does not exceed one-half inch.

11. A high voltage, oil filled cable termination terminating a high voltage power cable both emerging from an oil filled pipe system and having a current carrying center conductor formed of a plurality of wire strands, cable insulation surrounding said current carrying center conductor, an outer conductive sheath surrounding said cable insulation and a plurality of skid wires disposed in a helical fashion about said outer conductive sheath comprising an elongated, rigid, dielectric insulator housing the terminated end of said power cable, an annular mounting plate disposed immediately adjacent the lower longitudinal end of said insulator and physically supporting said insulator thereabove, connector means disposed at the upper longitudinal end of said insulator for making an external electrical connection to the terminated end of said power cable and means physically supporting the weight of said terminated end of said power cable, said physically supporting means comprising means electrically and mechanically securely engaging said skid wires to provide an electrical short circuit path between said skid wires and said mounting plate and to transfer the weight of said terminated end of said power cable from said skid wires to said mounting plate, at least a portion of said engaging means being disposed above said mounting plate and within said insulator.

12. A cable termination as defined in claim 11 wherein said engaging means comprises an annular, conductive support plate, at least a portion of said support plate being disposed above said mounting plate and within said insulator.

13. A cable termination as defined in claim 12 wherein said engaging means further comprises means physically securing said skid wires to said support plate, said securing means comprising a pair of threaded fasteners that engage a pair of threaded apertures formed in said support plate.

14. A cable termination as defined in claim 13 wherein said support plate further includes an annular recess formed therein receiving said skid wires, said threaded apertures being disposed in said recess.

15. A cable termination as defined in claim 13 further comprising means securely fastening said annular support plate to said annular mounting plate.

* * * * *